US007868726B2

(12) United States Patent
Asano

(10) Patent No.: US 7,868,726 B2
(45) Date of Patent: Jan. 11, 2011

(54) WINDING METHOD AND COIL UNIT

(75) Inventor: Mitsutoshi Asano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 214 days.

(21) Appl. No.: 12/085,910

(22) PCT Filed: Nov. 2, 2006

(86) PCT No.: PCT/JP2006/322429

§ 371 (c)(1),
(2), (4) Date: Jun. 2, 2008

(87) PCT Pub. No.: WO2007/074587

PCT Pub. Date: Jul. 5, 2007

(65) Prior Publication Data

US 2009/0167475 A1 Jul. 2, 2009

(51) Int. Cl.
*H01F 27/30* (2006.01)
*H01F 27/28* (2006.01)
*G11B 23/04* (2006.01)
*B21F 3/04* (2006.01)

(52) U.S. Cl. ....................... 336/198; 336/186; 336/188; 336/208; 336/222; 336/223; 242/347; 242/437.3

(58) Field of Classification Search ................. 336/186, 336/222, 223, 188, 198, 208; 242/347, 437.3
See application file for complete search history.

(56) References Cited

U.S. PATENT DOCUMENTS

| | | | | |
|---|---|---|---|---|
| 1,456,108 | A * | 5/1923 | Johannesen | 336/208 |
| 2,930,014 | A * | 3/1960 | Van Der Hoek et al. | 336/190 |
| 2,937,350 | A | 5/1960 | Sasaki et al. | |
| 3,851,830 | A * | 12/1974 | Barthalon | 336/208 |
| 4,352,081 | A * | 9/1982 | Kijima | 336/198 |
| 4,454,492 | A * | 6/1984 | Thackray | 336/69 |
| 4,988,055 | A * | 1/1991 | Sakai et al. | 242/159 |
| 6,499,689 | B1 | 12/2002 | Miyazaki | |
| 6,535,095 | B2 * | 3/2003 | Aoki et al. | 336/83 |
| 2001/0015393 | A1 | 8/2001 | Miyazaki et al. | |
| 2003/0209627 | A1 * | 11/2003 | Kawano et al. | 242/443 |
| 2005/0115628 | A1 | 6/2005 | Sasaki et al. | |

FOREIGN PATENT DOCUMENTS

| | | |
|---|---|---|
| JP | 8-203720 | 8/1996 |
| JP | 2000-245092 A | 9/2000 |
| JP | 2000-348959 | 12/2000 |
| JP | 2003-100531 A | 4/2003 |
| JP | 2004-119922 A | 4/2004 |
| JP | 2007-067171 A | 3/2007 |

* cited by examiner

*Primary Examiner*—Elvin G Enad
*Assistant Examiner*—Tszfung Chan
(74) *Attorney, Agent, or Firm*—Kenyon & Kenyon LLP

(57) ABSTRACT

A rectangular coil unit is manufactured in such a manner that two wires are simultaneously regularly wound on four outer surfaces of a bobbin having a rectangular section so that the wires advance obliquely together for a lane change corresponding to 0.5 wire on one (a lower surface side) of a pair of parallel surfaces of the four outer surfaces of the bobbin and for a lane change corresponding to 1.5 wires on the other one (an upper surface side) of the parallel surfaces.

4 Claims, 19 Drawing Sheets

WINDING METHOD AND COIL UNIT

This is a 371 national phase application of PCT/JP2006/322429 filed 2 Nov. 2006, claiming priority to Japanese Patent Application No. 2005-373322 filed 26 Dec. 2005, the contents of which are incorporated herein by reference.

TECHNICAL FIELD

The present invention relates to a winding method of regularly winding wires on a bobbin, and a coil unit manufactured by the method.

BACKGROUND ART

This type of technique has been know as a winding method disclosed in each of Japanese unexamined patent publications Nos. 2004-119922, 2000-348959, and 8(1996)-203720. Of them, for example, the publication '922 discloses a winding method using rotatable winding nozzles through which a plurality of wires is simultaneously supplied, thereby manufacturing both a multilayered coil and a parallel coil. According to this method, wires are wound on a bobbin as it is rotated, and further the wires are wound in multilayered or parallel relation as the nozzles are rotated about a predetermined rotation center.

DISCLOSURE OF INVENTION

Problems to Be Solved by the Invention

According to the winding method disclosed in the publication '922, the wires can be wound on the bobbin in either multilayer or parallel winding manner. However, this publication has no particular disclosure about how to wind wires to make a resultant coil compact. In a manufacturing process for a regularly concentrated winding coil, generally, a raised portion of the wound wires is likely to be generated near an end of the bobbin. This would result from inclination and floating of the wires at a row shift part and a layer shift part in regularly winding, namely, in a winding turn-back position. The regularly concentrated winding coil is likely to disorder the arrangement of the wires in the winding turn-back position, which is one of factors causing enlargement of a coil outer size,. leading to obstruction of miniaturization of the concentrated winding coil.

The present invention has been made. in view of the above circumstances and has an object to provide a method of regularly winding two wires, capable of preventing the generation of a raised portion of the wires in a winding turn-back position, thereby achieving a compact coil, and a coil manufactured by the winding method.

Means for Solving the Problems

To achieve the above object, the present invention provides a winding method of regularly winding two wires on a bobbin that is rectangular in section, having four outer surfaces including a pair of parallel surfaces, the method comprising the step of: winding the wires on the bobbin so that the wires advance obliquely together for a lane change corresponding to 0.5 wire on one of the pair of parallel surfaces and for a lane change corresponding to 1.5 wires on the other one of the pair of parallel surfaces.

According to the above structure, the wires are wound to advance obliquely together for the lane change corresponding to 0.5 wire (i.e. a half wire diameter) on one surface side of the pair of parallel surfaces of the four outer surfaces of the bobbin and the lane change corresponding to 1.5 wires (i.e. three and a half wire diameters) on the other surface side of the parallel surfaces. This method can provide less inclination of the wires as compared with for instance the lane change corresponding to 2 wires on one of the outer surfaces of the bobbin, with a consequent result that intersection of layered wires in turn-back positions of winding can be reduced. Further, differing from the case where the lane change corresponding to one wire is performed on each of parallel surfaces of four outer surfaces of the bobbin, the present invention does not cause one of the two wires to be left uncoiled in the turn-back position where the winding is completed.

According to the aforementioned invention, it is possible to prevent the generation of a raised portion in the turn-back positions when two wires are regularly wound, thereby achieving a compact coil without enlarging the outer coil size.

In the above method, preferably, the winding method is used to manufacture a rectangular coil unit including a coil having a rectangular section.

According to the above structure, the same operations and effects as above can be attained for a coil of a rectangular coil unit.

In the above method, preferably, the winding method is used to manufacture a trapezoidal coil unit including a coil having a trapezoidal section.

According to the above structure, the same operations and effects as above can be attained for a coil of a trapezoidal coil unit.

According to another aspect, the present invention provides a coil unit including two wires regularly wound on a bobbin that is rectangular in section and has four outer surfaces including a pair of parallel surfaces, wherein the wires are wound on the bobbin so that the wires advance obliquely together for a lane change corresponding to 0.5 wire on one of the pair of parallel surfaces and a lane change corresponding to 1.5 wires on the other one of the pair of parallel surfaces.

According to the above structure, the wires are wound to advance obliquely together for the lane change corresponding to 0.5 wire (i.e. a half wire diameter) on one surface side of the pair of parallel surfaces of the four outer surfaces of the bobbin and the lane change corresponding to 1.5 wires (i.e. three and a half wire diameters) on the other surface side of the parallel surfaces. Thus, the coil of the present invention can include less inclination of the wires as compared with for instance the lane change corresponding to 2 wires on one of the outer surfaces of the bobbin, with a consequent result that intersection of layered wires in turn-back positions of winding can be reduced. Further, differing from the case where the lane change corresponding to 1 wire is performed on each of parallel surfaces of four outer surfaces of the bobbin, the present invention does not cause one of the two wires to be left uncoiled in the turn-back position where the winding is completed.

According to the aforementioned invention, it is possible to prevent the generation of a raised portion in the turn-back positions when two wires are regularly wound, thereby achieving a compact coil without enlarging the outer coil size.

BEST MODE FOR CARRYING OUT THE INVENTION

First Embodiment

A detailed description of a first preferred embodiment of a winding method of the present invention applied to a rectangular coil unit will now be given referring to the accompanying drawings.

Figure 1:
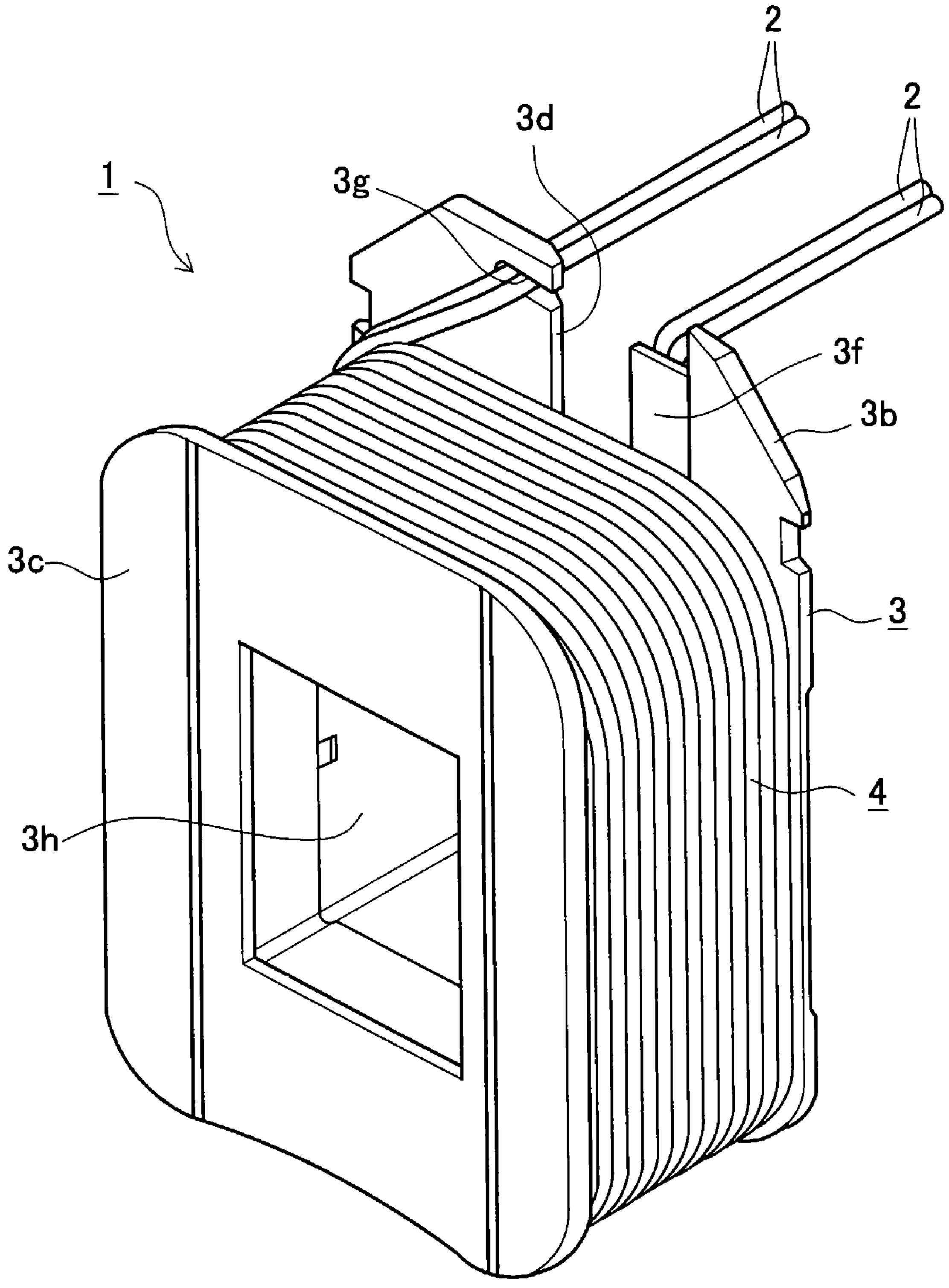
FIG. 1 is a perspective view of a rectangular coil unit.
Figure 2:
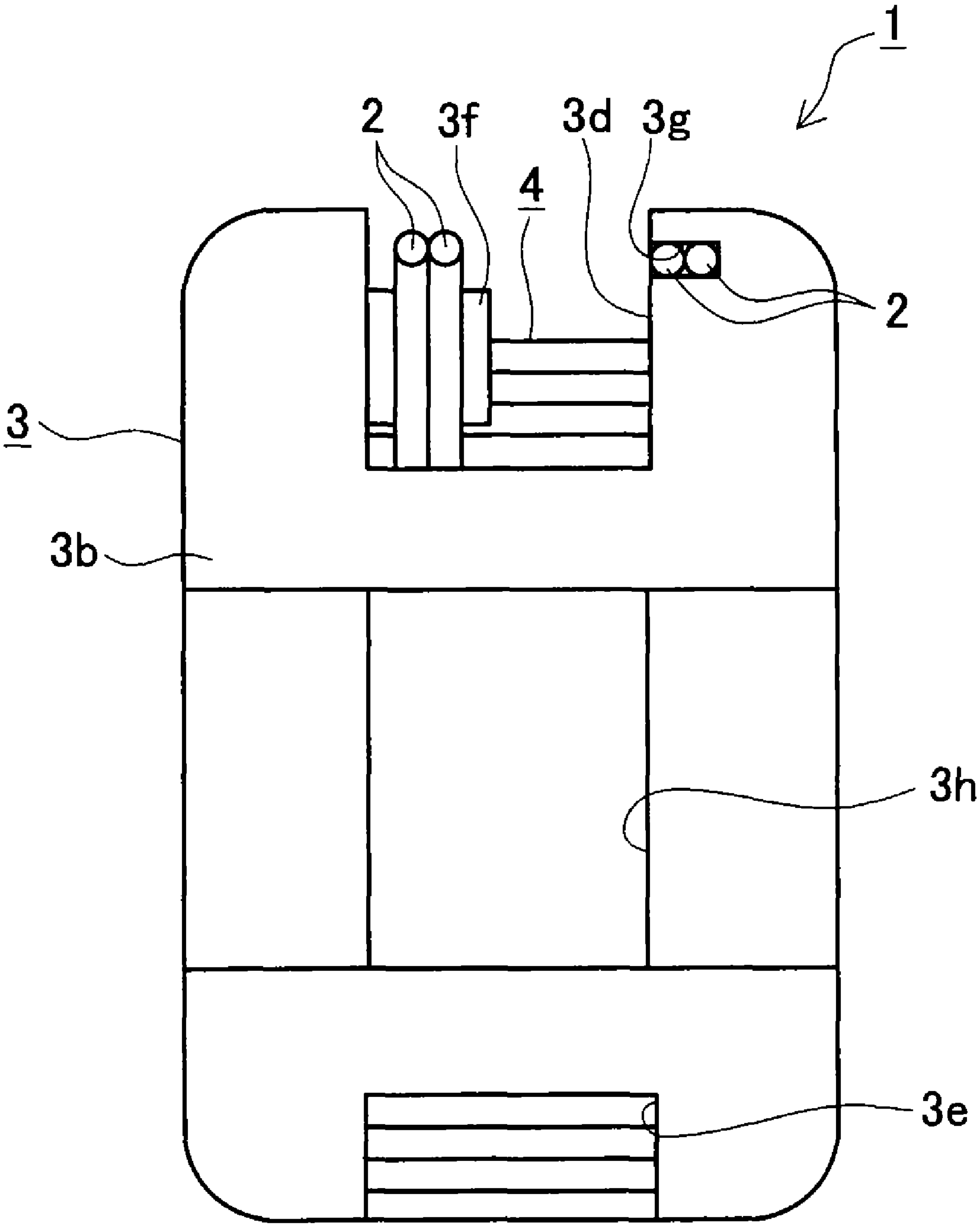
FIG. 2 is a back view of the rectangular coil unit.
Figure 3:
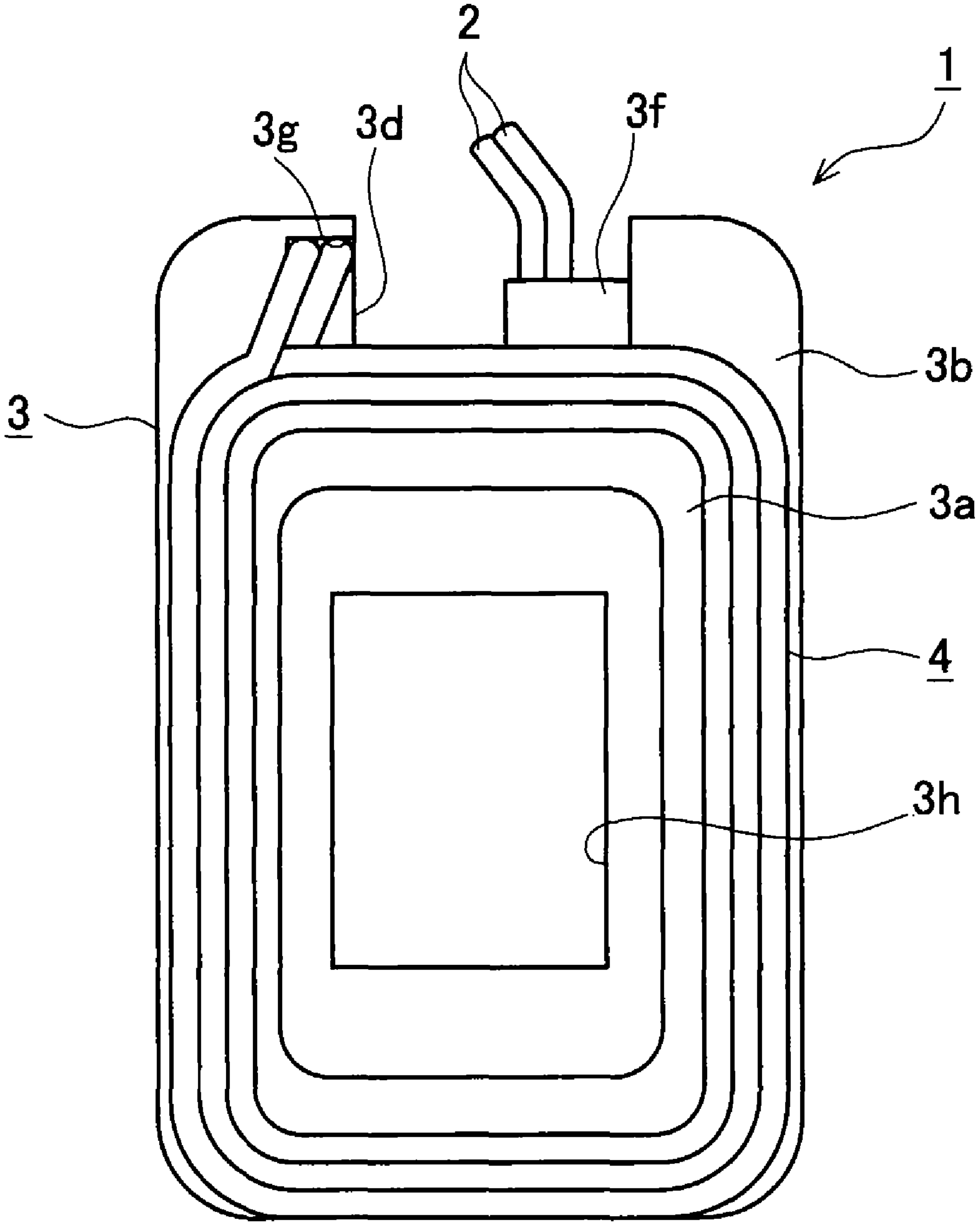
FIG. 3 is a front view of the rectangular coil unit from which a first flange is removed for convenience of explanation.

FIG. 1 is a perspective view of a rectangular coil unit 1 in the present embodiment. FIG. 2 is a back view of the rectangular coil unit 1. FIG. 3 is a front view of the rectangular coil unit 1 from which a first flange is removed for convenience of explanation. The rectangular coil unit 1 in the present embodiment is manufactured in such a manner that a pair of two wires 2 is simultaneously regularly wound on four outer surfaces of a bobbin 3 having a rectangular section. A plurality of the rectangular coil units 1 will be mounted in a plurality of teeth formed on the inner periphery of a stator core, thus constituting a stator. This stator is further assembled with a rotor, producing a motor.

The bobbin 3 includes a core tube 3*a* of a rectangular section, a first flange 3*b* and a second flange 3*c* formed at both axial ends of the core tube 3*a*. The bobbin 3 is made of a synthetic resin such as PPS (polyphenylene sulfide) to have an insulating property. The first flange 3*b* provided on a rear side has a distinctive shape as compared with the second flange 3*c* provided on a front side having a nearly normal rectangular shape. Specifically, the first flange 3*b* includes upper and lower cutout portions 3*d* and 3*e*, an insulating wall 3*f* protruding from one of side surfaces of the upper cutout portion 3*d* in FIG. 3 toward the other side surface, and a stopper groove 3*g* formed in the upper portion. The core tube 3*a* is hollow, providing a center hole 31*h*. A clearance is formed between the insulating wall 3*f* and a lower surface of the upper cutout portion 3*d* as shown in FIG. 2. Onto the core tube 3*a*, two wires 2 are simultaneously regularly wound, forming a coil 4 having a hollow rectangular shape. Both end portions of each of two wires 2 are partly engaged with the insulating wall 3*f* and the stopper groove 3*g*. In the present embodiment, a relatively thick wire 2 is used to achieve a small-sized high-power motor. The wire 2 is made of a copper wire coated with an enamel insulating film.

In the above rectangular coil unit 1, two wires 2 are guided onto the core tube 3*a* inside the first flange 3*b* through the clearance between the insulating wall 3*f* and the lower surface of the cutout portion 3*d*. Those two wires 2 are sequentially wound in a row on the core tube 3*a* in a direction advancing from the first flange 3*b* to the second flange 3*c*, forming a first layer. Then, the wires 2 are turned (folded) back along the second flange 3*c* and sequentially wound in a row on the first layer in a direction opposite to that for the first layer from the second flange 3*c* to the first flange 3*b*, forming a second layer. The two wires 2 are wound regularly and reciprocally in opposite directions along the axis of the core tube 3*a* as above, forming the coil 4 with a plurality of rows and a plurality of layers of wires. After winding, the end portions of the two wires 2 are engaged in the stopper groove 3*g*. The rectangular coil unit 1 including the coil 4 formed in the above manner to have a rectangular section is thus manufactured.

The wiring method in the present embodiment has special features in a method of winding two wires.

Figure 4:
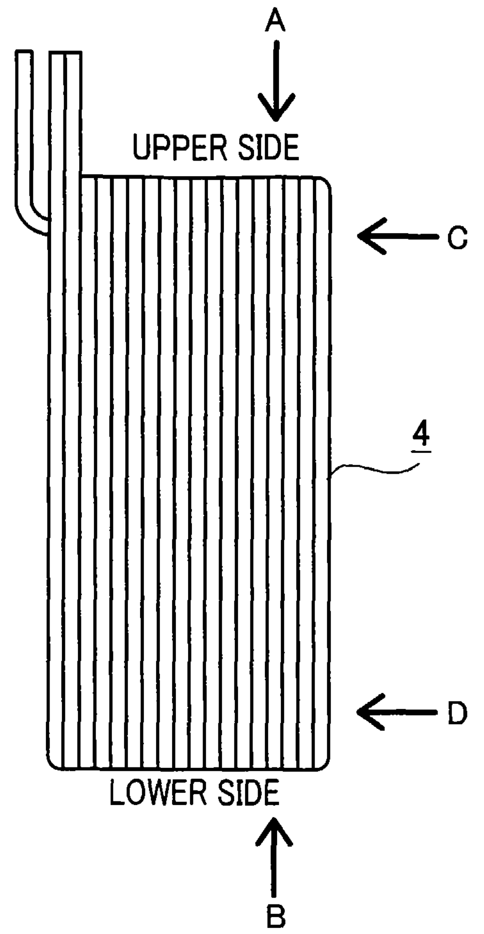
FIG. 4 is a side view of a coil on a bobbin.
Figure 5:
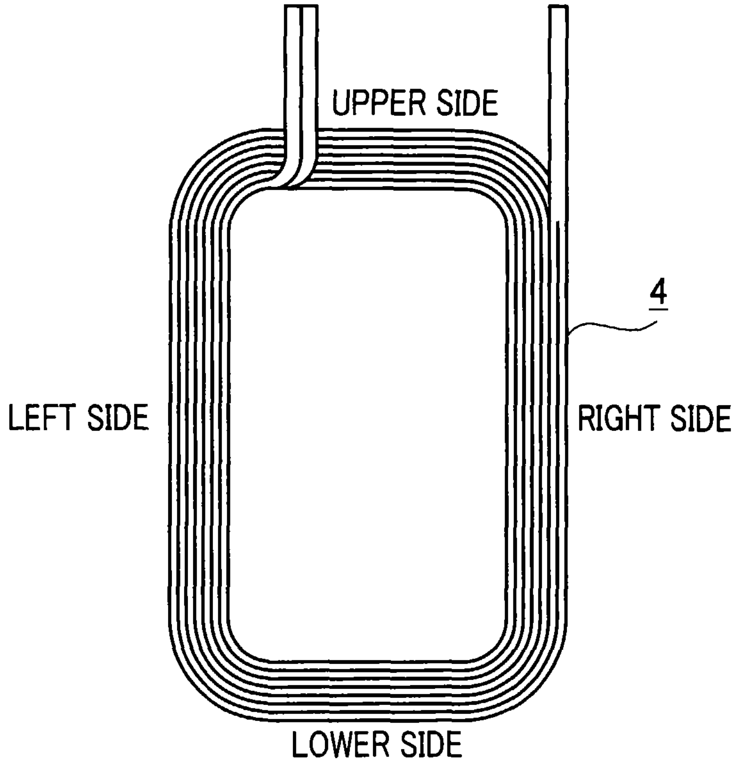
FIG. 5 is a back view of the coil on the bobbin.

FIG. 4 is a side view of the coil 4 on the bobbin 3. FIG. 5 is a back view of the coil 4 on the bobbin. FIGS. 6A to 6D are views seen from direction indicated by arrows A, B, C, and D in FIG. 4. FIG. 7 is a pattern diagram of the arrangement of the coil 4 on the bobbin 3. It is to be noted that the numbers to the wires 2 in FIG. 7 are merely given to facilitate the explanation of the wire arrangement and thus do not match to those in FIGS. 6A to 6D. In the present embodiment, as shown in FIGS. 4 to 7, two wires 2 are wound in such a manner as to advance obliquely together for a lane change corresponding to 0.5 wire (i.e. a half wire diameter) on a lower surface side of the core tube 3*a* of the bobbin 3 having four outer surfaces including a pair of upper and lower parallel surfaces and to advance obliquely together for a lane change corresponding to 1.5 wires (i.e. one and a half wire diameters) on an upper surface side thereof (hereinafter, this winding method is referred to as "1.5-0.5 change"). Thus, the lane changes corresponding to a total of two wire diameters are performed on the upper and lower sides of the bobbin 3.

Figure 6A:
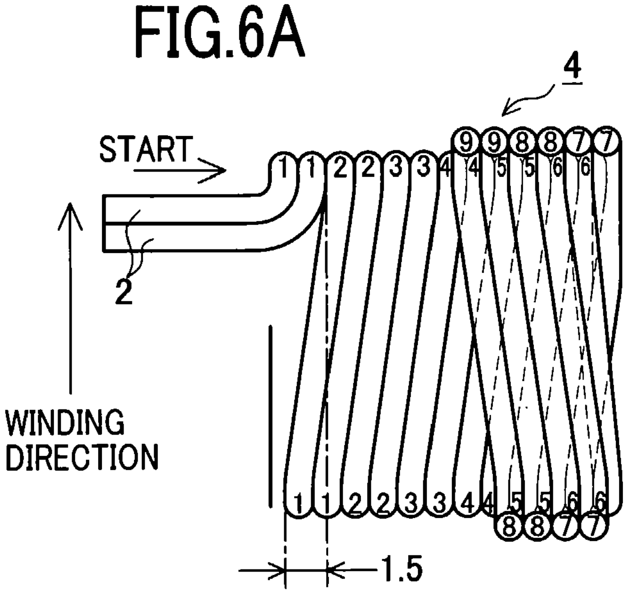
FIGS. 6A to 6D are views seen from. directions indicated by arrows A, B, C, and D in FIG. 4.
Figure 6C:
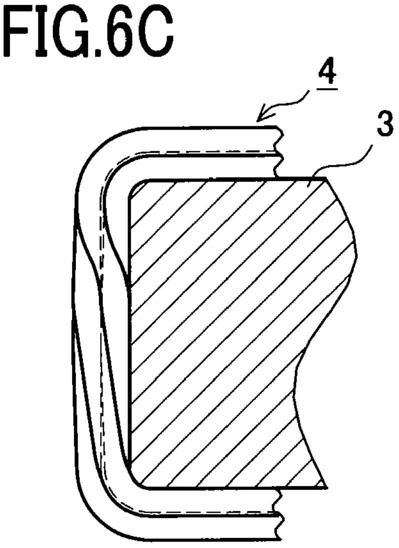
Figure 6B:
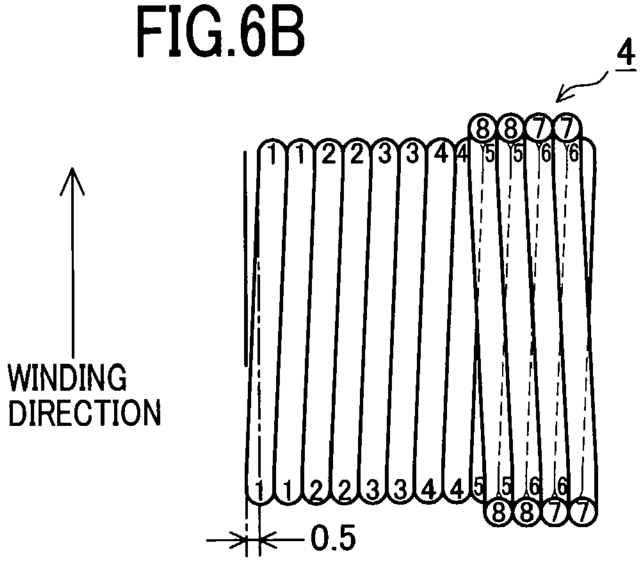
Figure 6D:
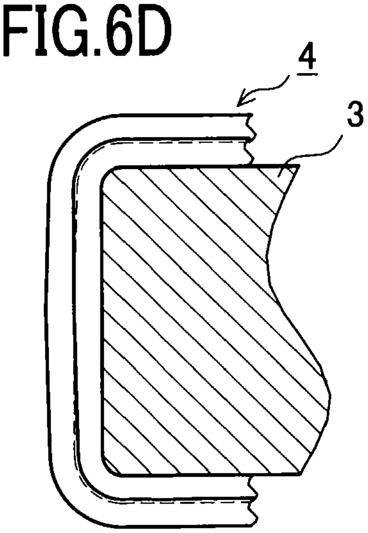
Figure 7:
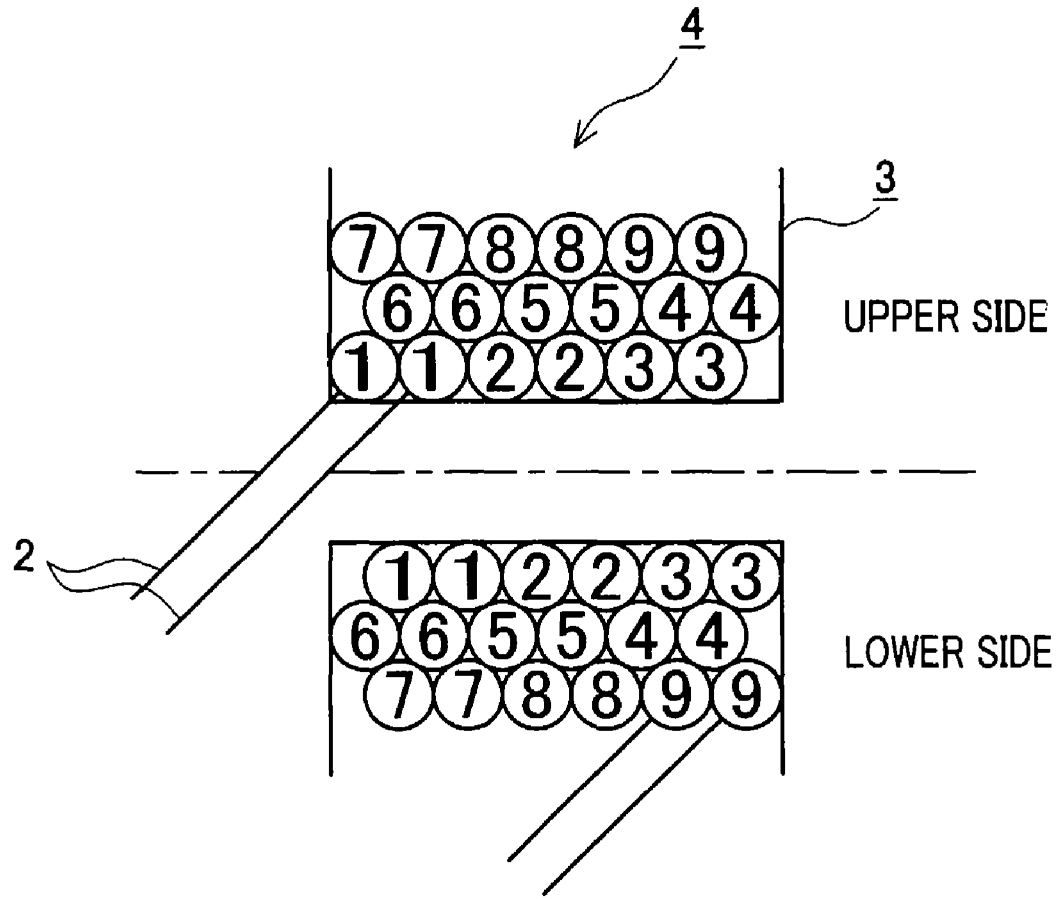
FIG. 7 is a pattern diagram showing an arrangement of the coil on the bobbin.
Figure 8A:
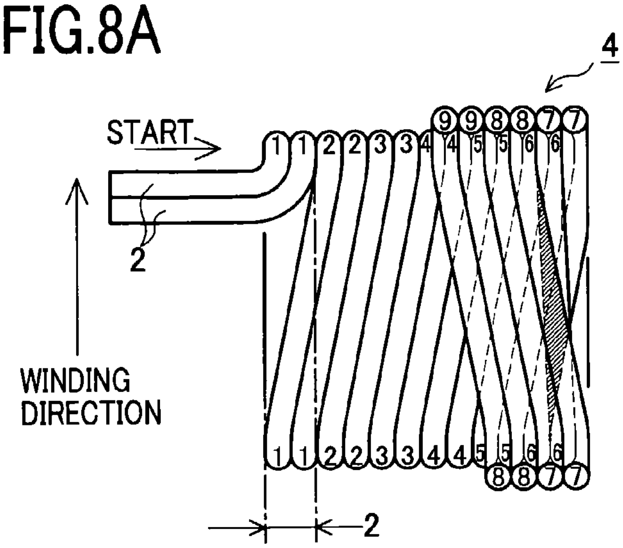
FIGS. 8A to 8D are views seen from directions indicated by arrows A, B, C, and D in FIG. 4.
Figure 8C:
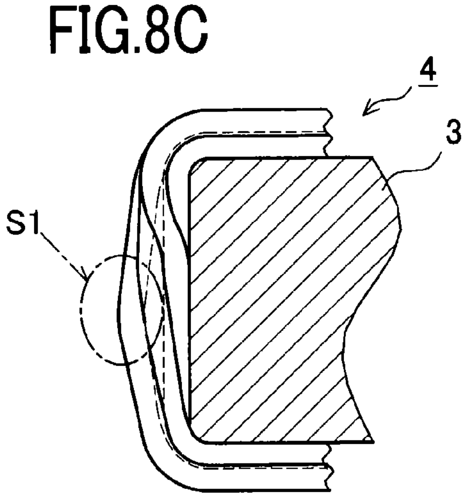
Figure 8B:
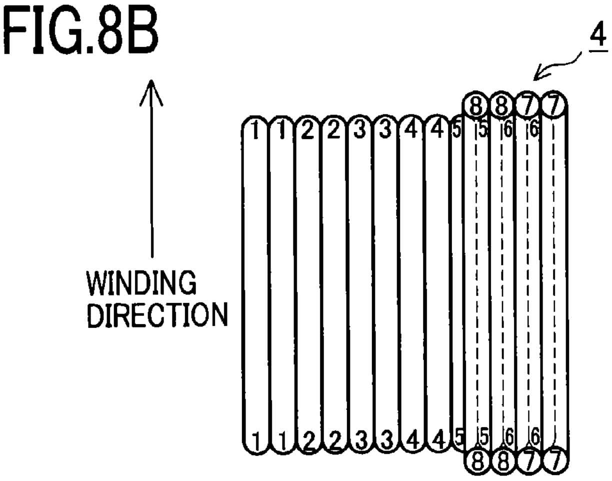
Figure 8D:
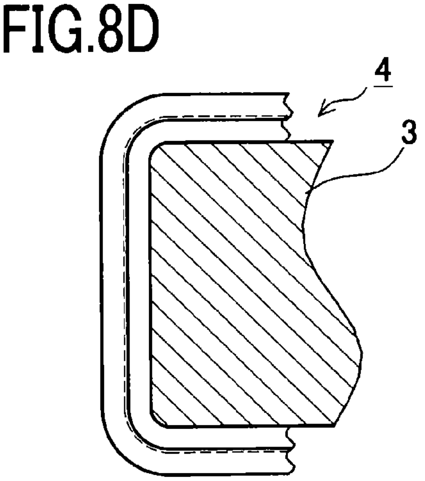

To be concrete, as indicated by number "1" (representing the first turn of the wires 2) in FIGS. 4, 5, and 6A, two wires 2 start to be wound from an upper side and along the first flange 3*b* to a left side, and then vertically downward to a lower side. Successively, the wires 2 advance obliquely together for the 0.5-wire lane change on the lower side, as indicated by number "1" in FIG. 6B, and then vertically upward on a right side to the upper side. As indicated by numbers "1" and "2" in FIG. 6A, on the upper side, the wires 2 advance obliquely together for the 1.5-wire lane change and vertically downward again on the left side to the lower side. Thereafter, the above lane changes are repeated as in the above manner on the upper side and the lower side respectively. The first layer of the coil 4 is thus formed (the first layer has 6 turns as indicated by numbers "1" to "6" in FIGS. 6A and 6B.) After completion of a winding operation for the first layer, the wires 2 are turned (folded) back at an opposite position from the winding start position. On the lower side, the 0.5-wire lane change is performed in the direction opposite to that for the first layer as shown in FIG. 6B. On the upper side, the 1.5-wire lane change is performed in the direction opposite to that the first layer as shown in FIG. 6A.

Figure 9:
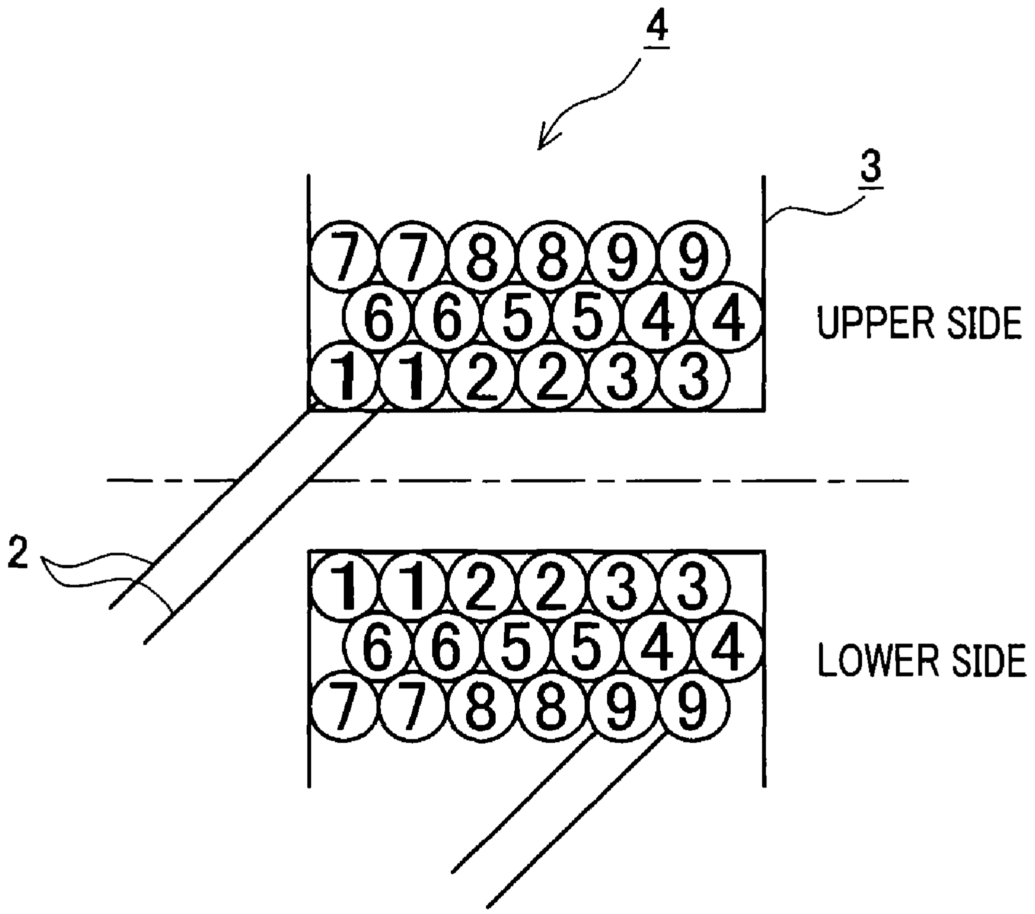
FIG. 9 is a pattern diagram showing an arrangement of the coil on the bobbin.
Figure 10A:
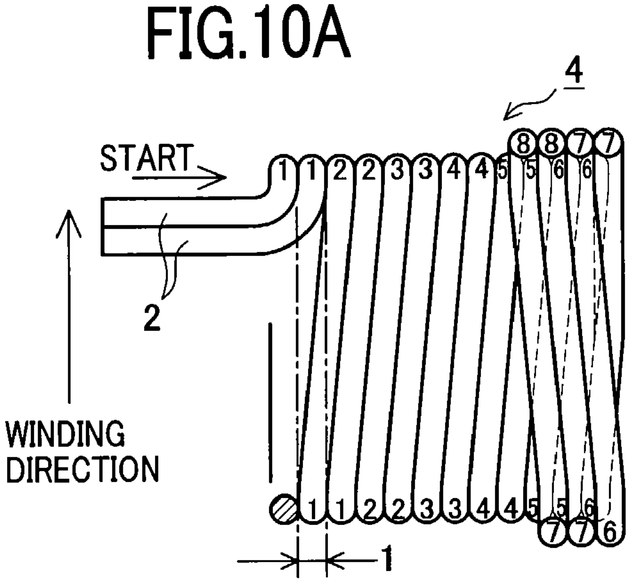
FIGS. 10A to 10D are views seen from directions indicated by arrows A, B, C, and D in FIG. 4.
Figure 10C:
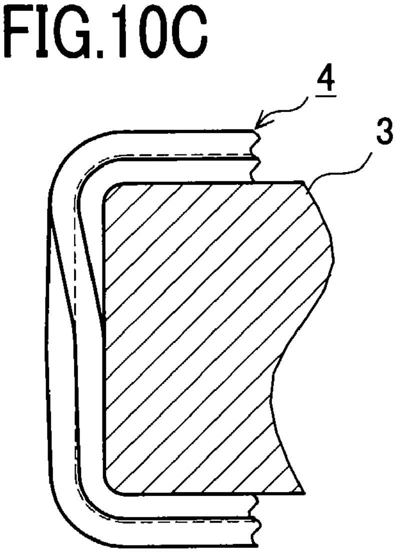
Figure 10B:
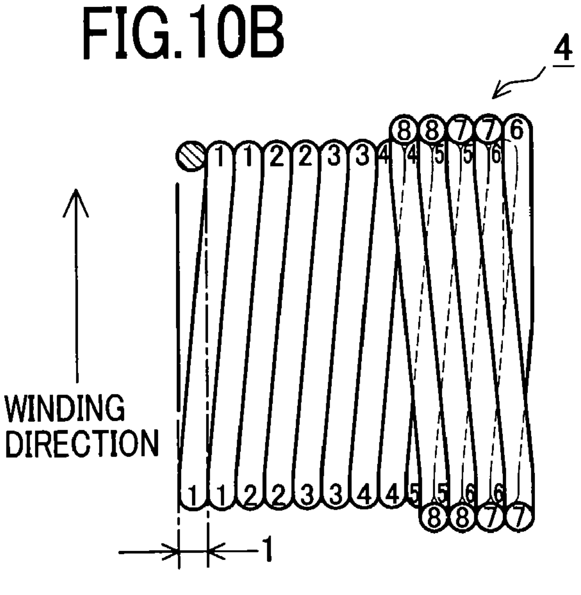
Figure 10D:
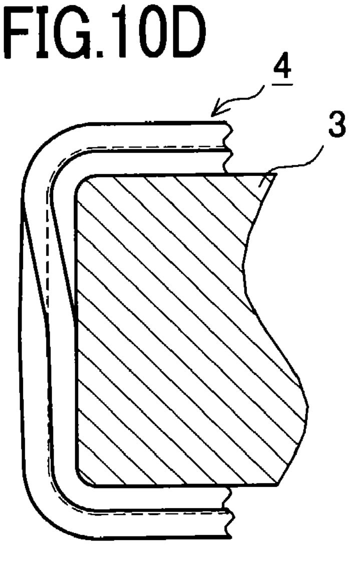

Here, for comparison with the "1.5-0.5 change" in the present embodiment, different winding methods therefrom will be explained. FIGS. 8A to 8D are views seen from the directions indicated by arrows A, B, C, and D in FIG. 4. FIG. 9 is a pattern diagram of the arrangement of the coil 4 on the bobbin 3. It is to be noted that the numbers to the wires 2 in FIG. 9 are merely given to facilitate the explanation of the wire arrangement and thus do not match to those in FIGS. 8A to 8D. In the winding method shown in FIGS. 8 and 9, two wires 2 are wound in such a manner as to traverse together straight for a lane change corresponding to 0 wire (i.e. no lane change) on the lower surface side of the core tube 3*a* of the bobbin 3 having four outer surfaces including a pair of upper and lower surfaces and to advance. obliquely together for a lane change corresponding to 2 wires (i.e. two wire diameters) on an upper surface side (hereinafter, this winding method is referred to as "2-0 change"). Thus, the lane changes corresponding to a total of two wire diameters are performed on the upper and lower sides of the bobbin 3. This winding method causes the wires 2 to intersect and overlap in three layers in the winding turn-back positions as a shaded area in FIG. 8A, generating a raised portion as shown by a dot-dashed circular line S1 in FIG. 8C.

Figure 11:
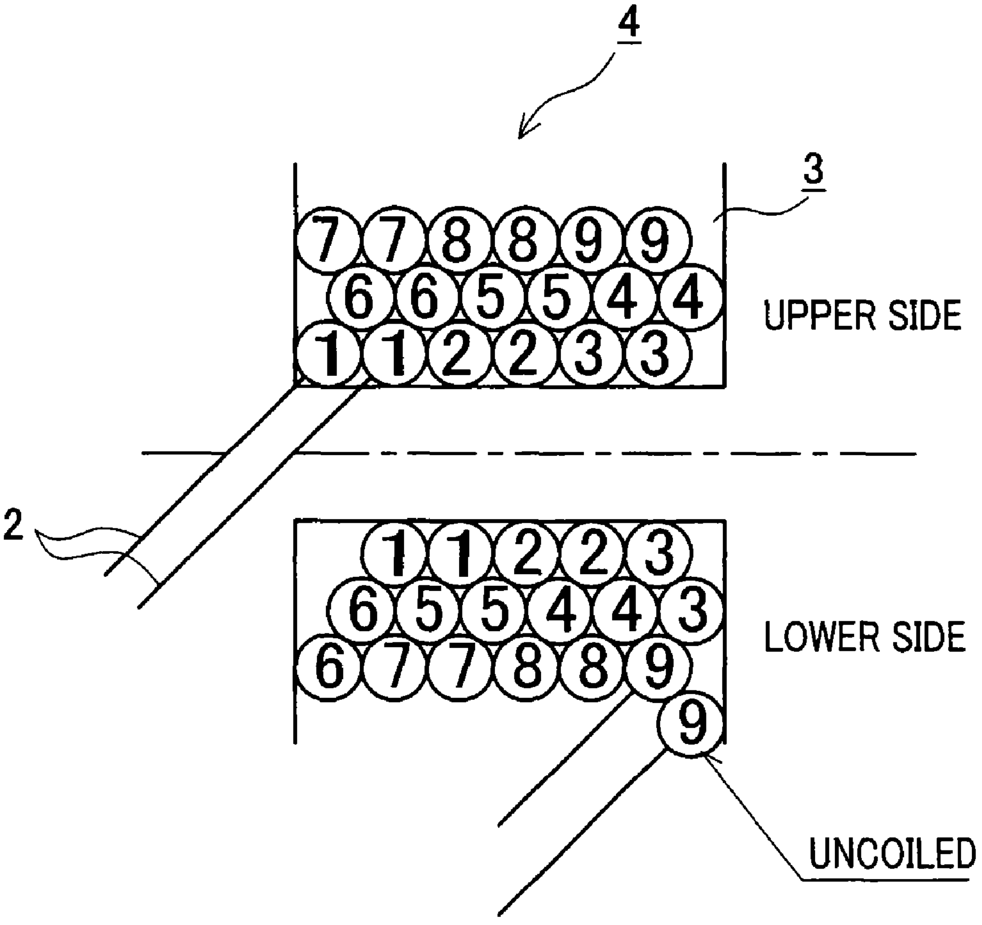
FIG. 11 is a pattern diagram showing an arrangement of the coil on the bobbin.

On the other hand, FIGS. 10A to 10D are views seen from the directions indicated by arrows A; B, C, and D in FIG. 4. FIG. 11 is a pattern diagram of the arrangement of the coil 4 on the bobbin 3. It is to be noted that the numbers to the wires 2 in FIG. 11 are merely given to facilitate the explanation of the wire arrangement and thus do not match to those in FIGS. 10A to 10D. In the winding method shown in FIGS. 10 and 11, two wires 2 are wound in such a manner as to advance obliquely together for a lane change corresponding to 1 wire (i.e. one wire diameter) on a lower surface side of the core tube 3*a* of the bobbin 3 having four outer surfaces including a pair of upper and lower surfaces and to advance obliquely together for a lane change corresponding to 1 wire (i.e. one wire diameter) on an upper surface side (hereinafter, this winding method is referred to as "1-1 change"). Thus, the lane changes corresponding to a total of two wire diameters are performed on the upper and lower sides of the bobbin 3. According to this method, when the winding is completed at the end of the bobbin 3, as shown in FIG. 11, one of the wires 2 is left uncoiled in that winding end position corresponding to the winding turn-back position in FIG. 11.

According to rectangular coil unit 1 and the winding method thereof in the present embodiment described as above, the two wires 2 are wound to advance obliquely together for the 0.5-wire lane change on the lower surface side of the core tube 3*a* of the bobbin 3 having the four outer surfaces including the pair of upper and lower surfaces and for the 1.5-wire lane change on the upper surface side. As compared with the winding method using the "2-0 change" whereby the 2-wire lane change is performed on only the upper side of the bobbin 3 as shown in FIGS. 8 and 9, the winding method in the present embodiment can provide less inclination of the wires 2, with a consequent result that intersection of layered wires of the coil 4 in the vicinity of each flange 3*b*, 3*c* of the bobbin 3, that is, in the winding turn-back positions can be reduced. Differing from the winding method using the "1-1 change" whereby the 1-wire lane change is performed on both the upper and lower sides of the bobbin 3 as shown in FIGS. 10 and 11, the winding method in the present embodiment can prevent one wire to be left uncoiled in the winding end position located in the vicinity of each flange 3*b*, 3*c* of the bobbin 3 where the winding is completed. Accordingly, in simultaneously regularly winding two wires 2 for manufacturing the rectangular coil unit 1, it is possible to prevent the generation of a raised portion in the winding turn-back positions. This makes it possible to form the coil 4 compact without enlarging the outer size of the coil 4.

Figure 12:
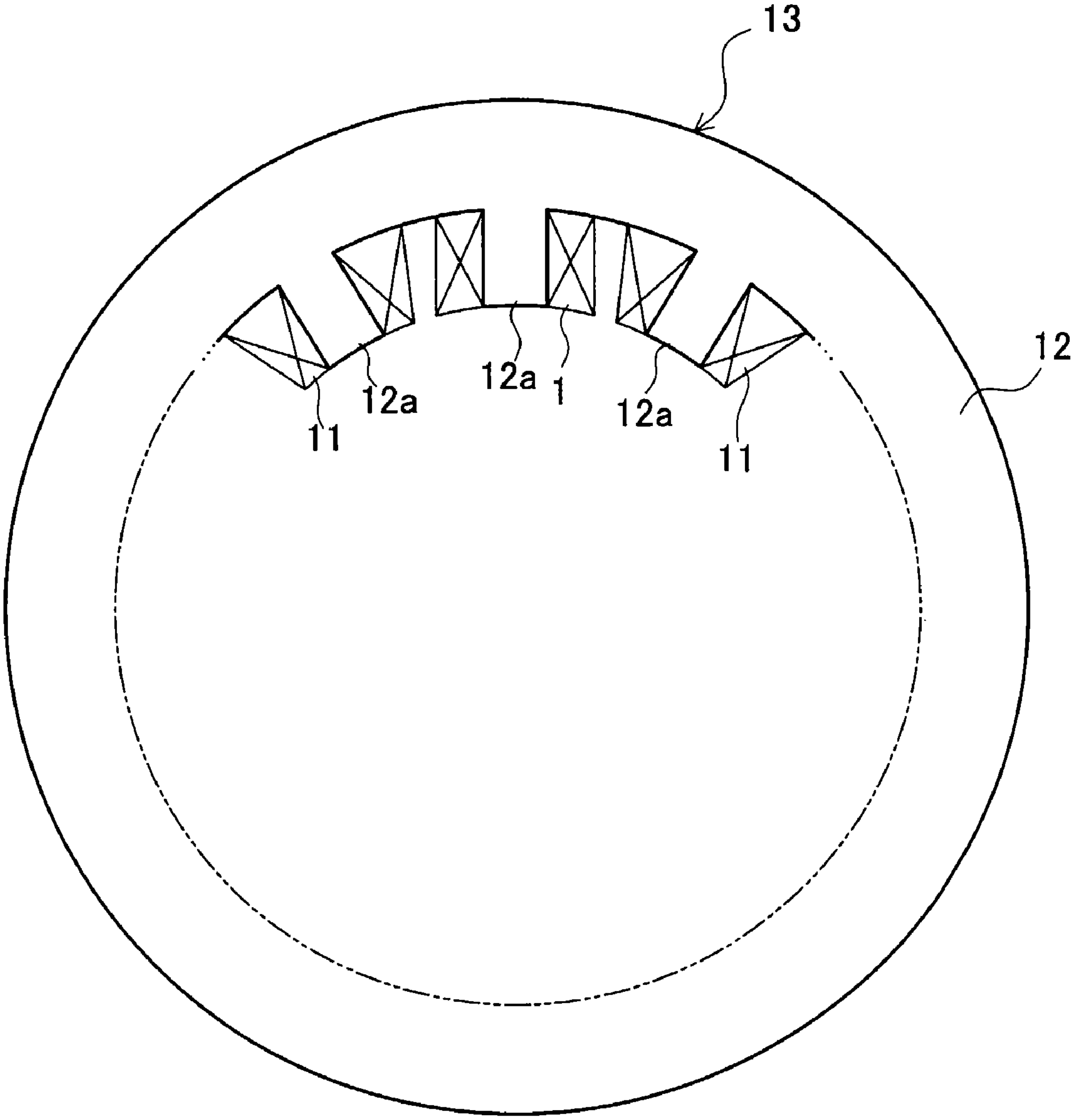
FIG. 12 is a schematic view showing a structure of a stator.

Here, as shown in FIG. 12 for example, this rectangular coil unit 1 may be mounted in each of teeth 12*a* of a stator core 12 in such a manner that trapezoidal coil units 11 and rectangular coil units 1 are alternately arranged to constitute a stator 13. As mentioned above, the generation of a raised portion in the winding turn-back positions can be restrained, thus making compact the coil 4 of the rectangular coil unit 1. In this case, as shown in an enlarged view in FIG. 13, a predetermined distance can be ensured between the coil 4 of the rectangular coil unit 1 and the coil 4 of the trapezoidal coil unit 11 adjacent thereto. It is therefore possible to increase a space factor in assembly, ensure the insulation between the adjacently arranged coil units 1 and 11, and thus enhance performance of a motor using the above stator 13.

The rectangular coil unit 1 manufactured according to the winding method in the present embodiment is configured so that two wires 2 are simultaneously regularly wound on the bobbin 3. The eddy-current loss of the rectangular coil unit 1 can therefore be reduced, which contributes to making the motor high-powered. The productivity of the rectangular coil units 1 can also be increased.

Second Embodiment

A second embodiment of the winding method of the present invention, applied to a trapezoidal coil unit, will be explained below referring to the accompanying drawings.

It is to be noted that identical or similar elements to those in the first embodiment are given the same reference numerals and their explanations are omitted. The following description will be made with a focus on different structures from the first embodiment.

Figure 13:
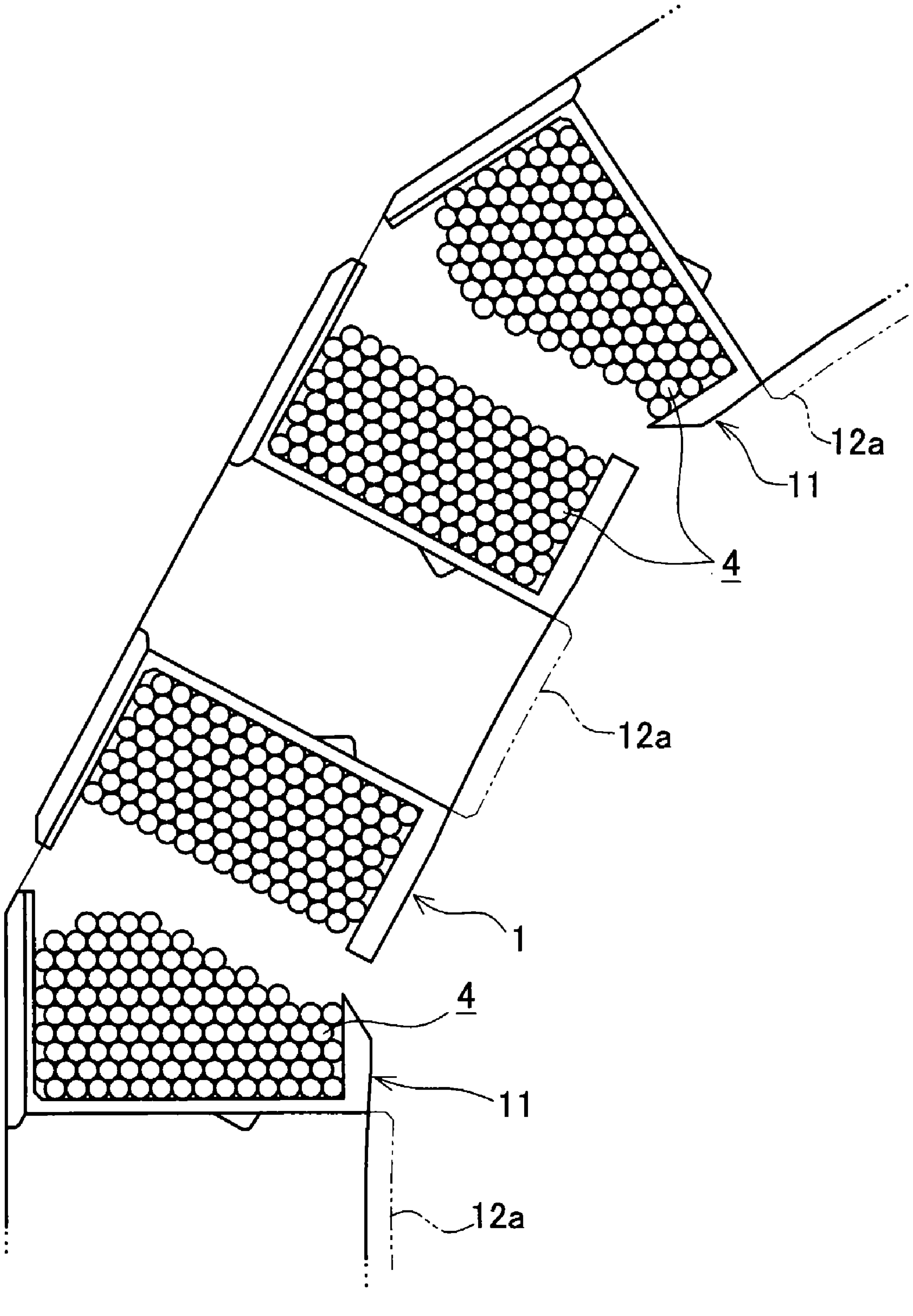
FIG. 13 is a view showing an assembled state of the rectangular coil unit and a trapezoidal coil unit in the stator.
Figure 14:
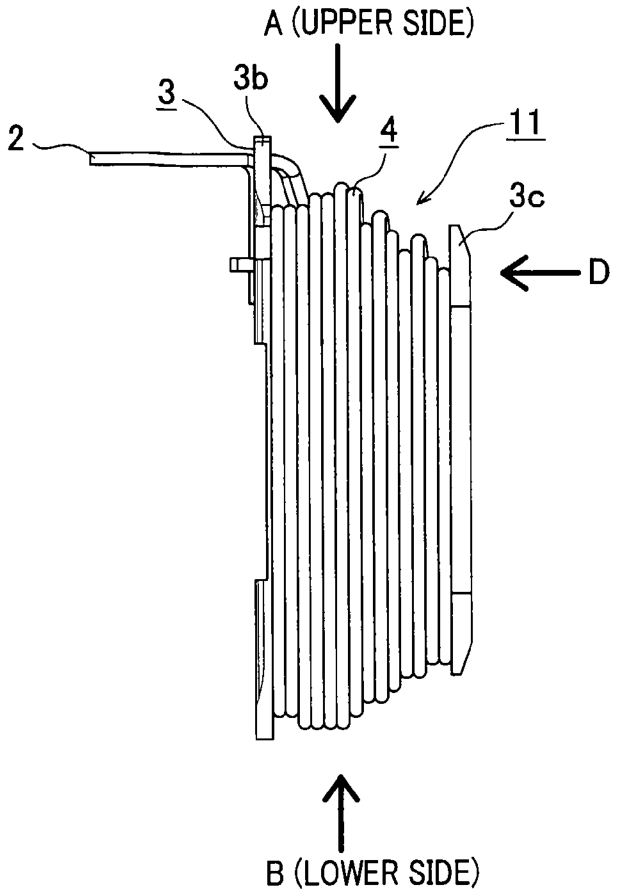
FIG. 14 is a side view of a trapezoidal coil unit.
Figure 15:
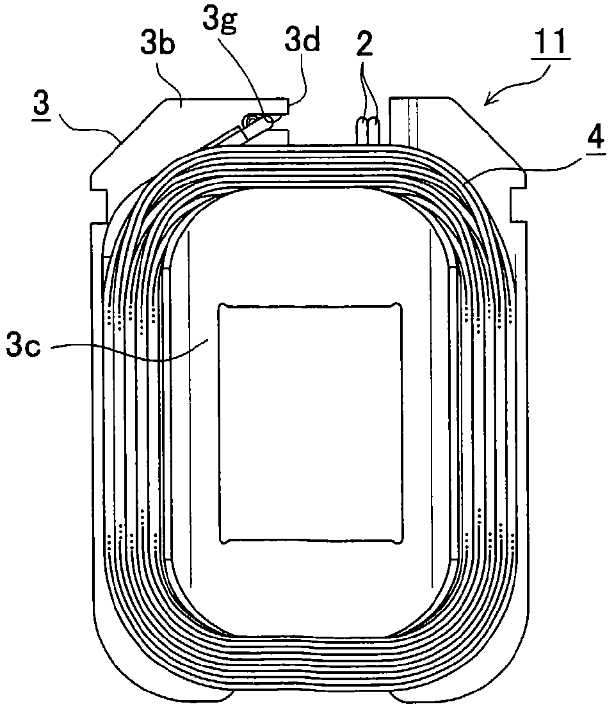
FIG. 15 is a front view of the trapezoidal coil unit.
Figure 16A:
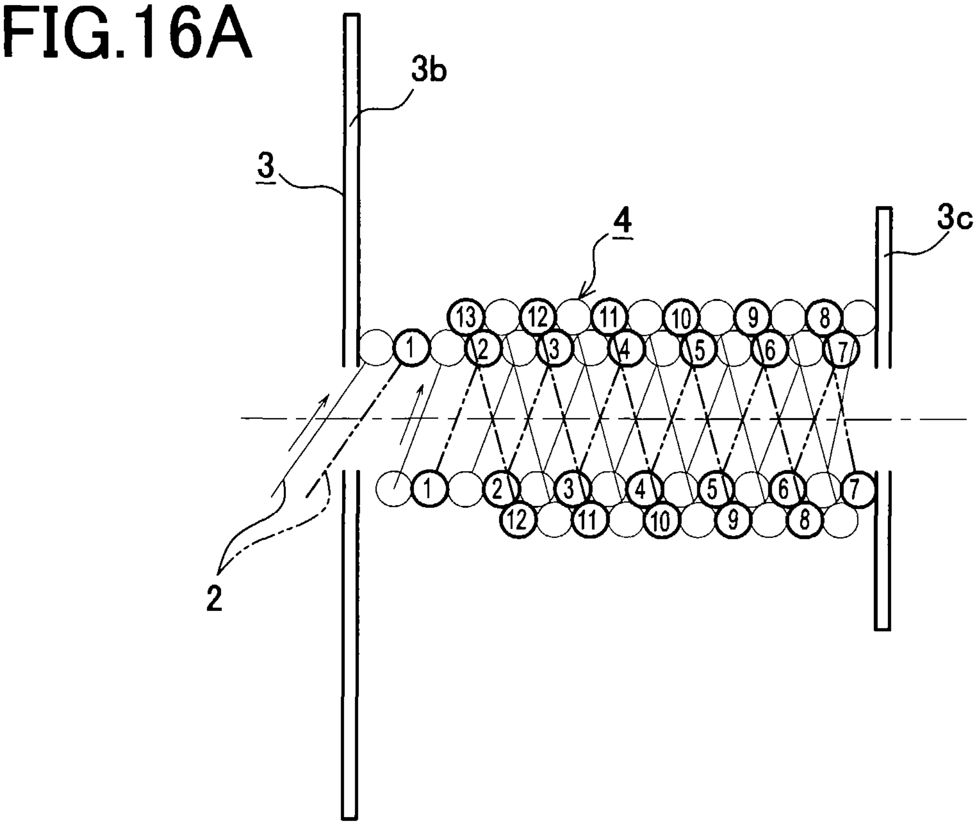
FIGS. 16A and 16B are explanatory views showing a process of winding wires on a bobbin, relating to first and second layers.
Figure 16B:
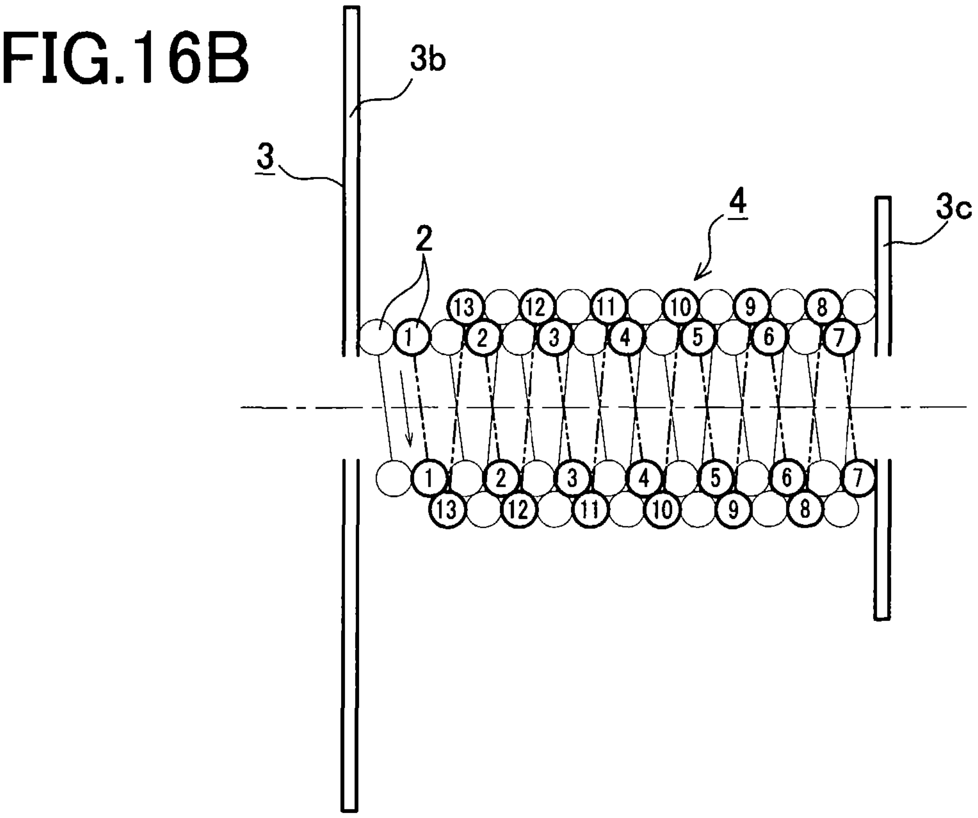

FIG. 14 is a side view of a trapezoidal coil unit 11 in the present embodiment. FIG. 15 is a front view of the trapezoidal coil unit 11 seen from a direction indicated by arrow D in FIG. 14. The trapezoidal coil unit 11 in the present embodiment is manufactured in such a manner that two wires 2 are simultaneously regularly wound on four outer surfaces of a bobbin 3 having a rectangular section, whereby forming a wound coil 4 having a trapezoidal section. This trapezoidal coil unit 11 will be mounted in each of teeth 12*a* of a stator core 12 so that the trapezoidal coil units 11 and the rectangular coil units 1 are arranged alternately as shown in FIGS. 12 and 13 to constitute a stator 13.

In the present embodiment, the bobbin 3 has substantially the same structure as the bobbin 3 in the first embodiment except that the bobbin 3 in this embodiment has a second flange 3*c* smaller than a first flange 3*b*. In the embodiment, the method of winding two wires 2 is implemented in the same manner as the winding method in the first embodiment. FIGS. 16A, 16B to FIGS. 21A, 21B show the process of winding the wires 2 on the bobbin 3, in which circled numbers represent the order of turns of the wires 2. FIGS. 16A to 21A show a lead side of the bobbin 3, namely, a view of the bobbin 3 (the upper side thereof) seen from a direction indicated by arrow A in FIG. 14. FIGS. 16B to 21B show an opposite side of the bobbin 3 to the lead side, namely, a view of the bobbin 3 (the lower side thereof) seen from a direction indicated by arrow B in FIG. 14. In the present embodiment, as shown in FIGS. 16 to 21, two wires 2 are also regularly wound in such a manner as to advance obliquely together for a lane change corresponding to 0.5 wire (i.e. a half wire diameter) on a lower surface side of the bobbin 3 having four outer surfaces including a pair of upper and lower parallel surfaces and for a lane change corresponding to 1.5 wires (i.e. one and a half wire diameters) on an upper surface side of the bobbin 3 ("1.5-0.5 change"). Thus, the lane changes corresponding to a total of two wire diameters are performed on the upper and lower sides of the bobbin 3.

Figure 17A:
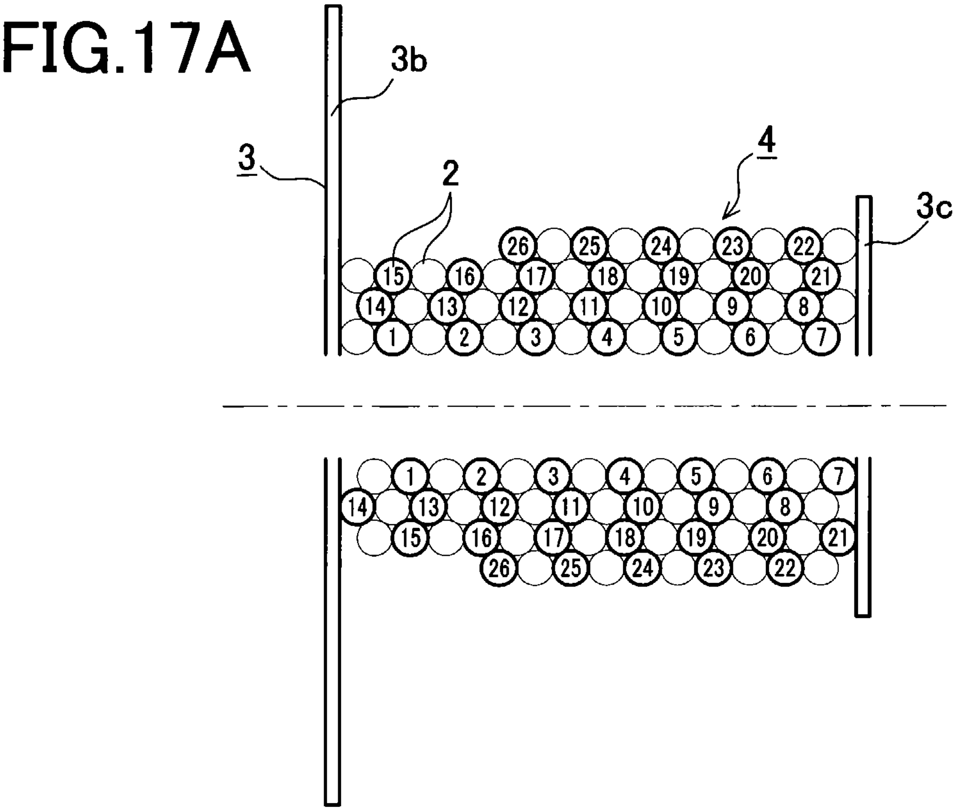
FIGS. 17A and 17B are explanatory views showing a process of winding wires on the bobbin, relating to second to fourth layers.
Figure 17B:
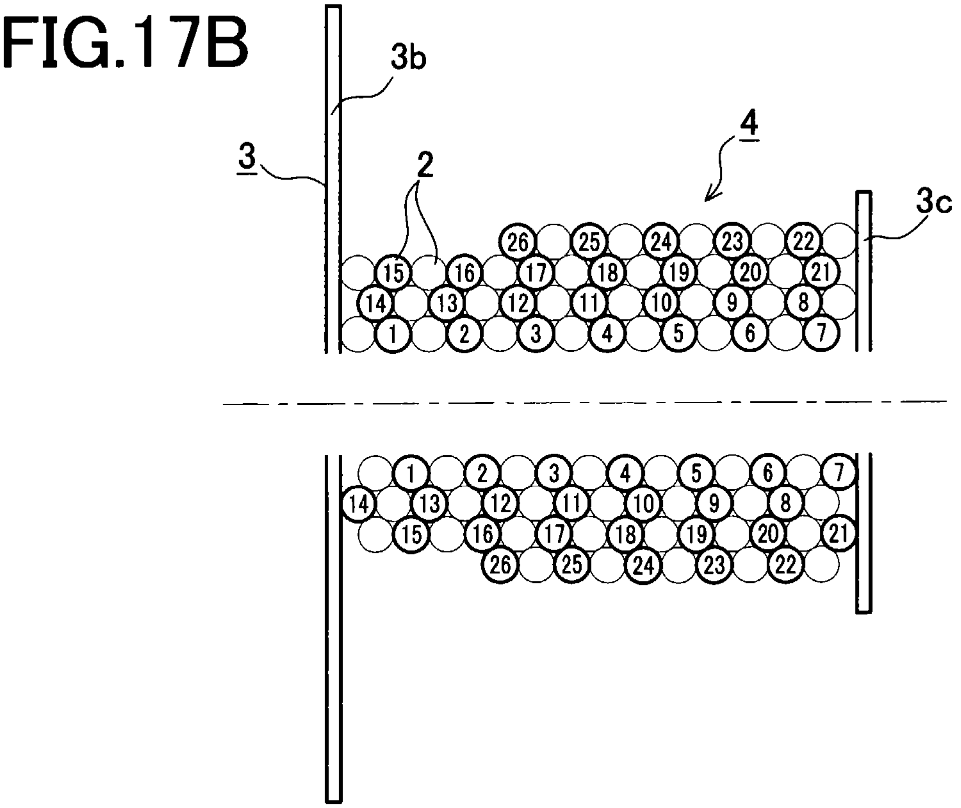
Figure 18A:
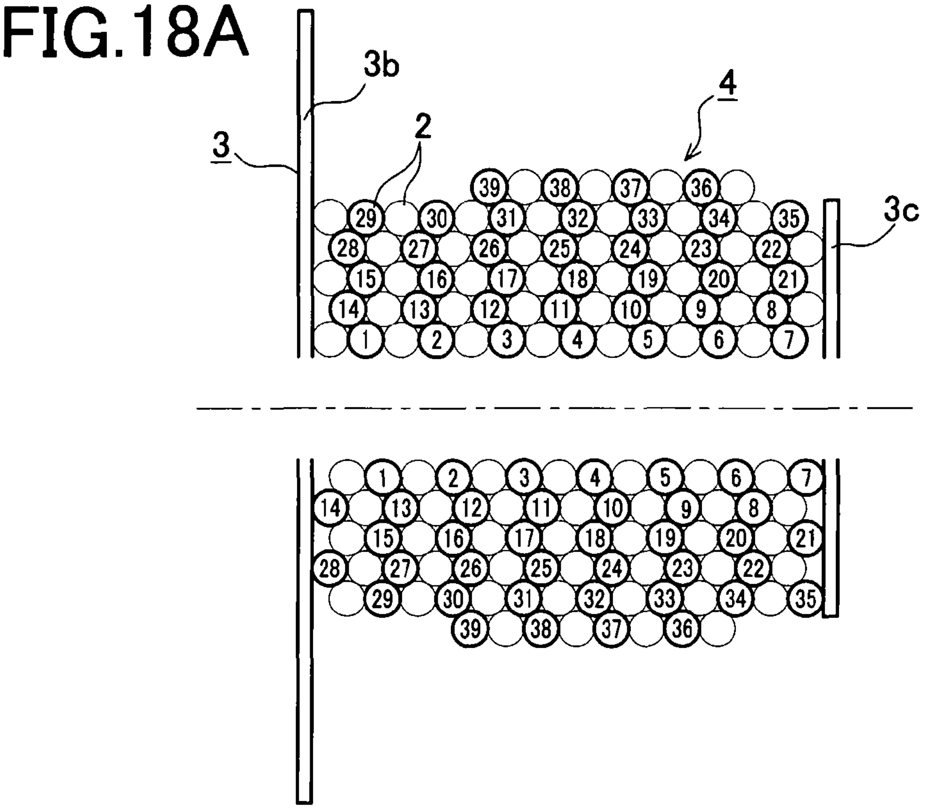
FIGS. 18A and 18B are explanatory views showing a process of winding wires on the bobbin, relating to fourth to sixth layers.
Figure 18B:
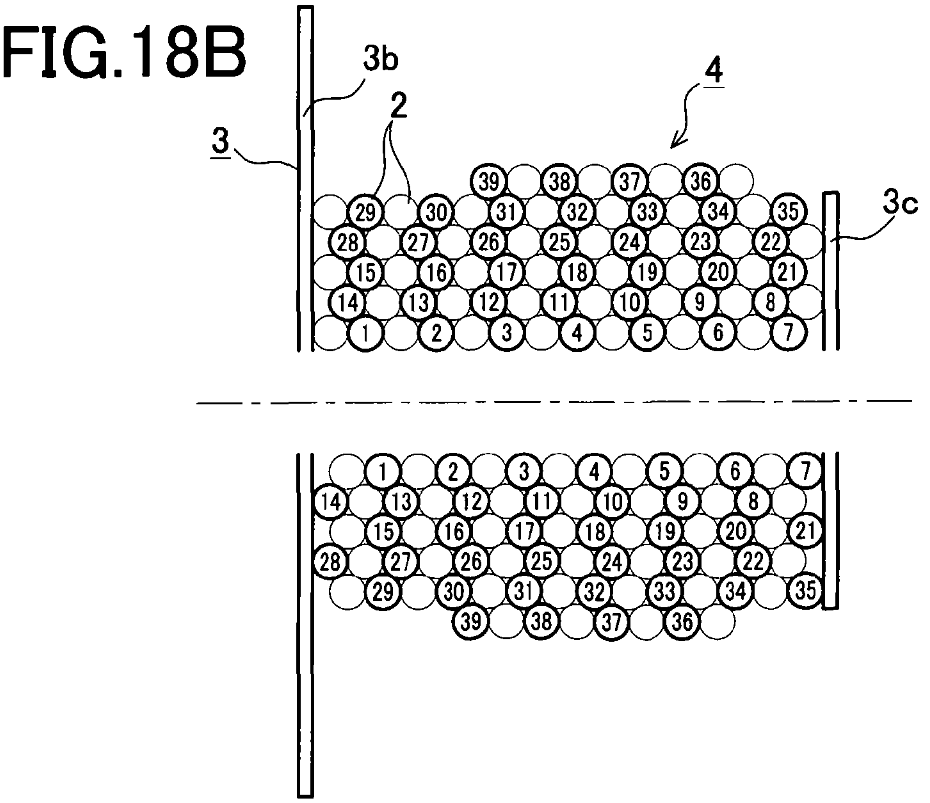
Figure 19A:
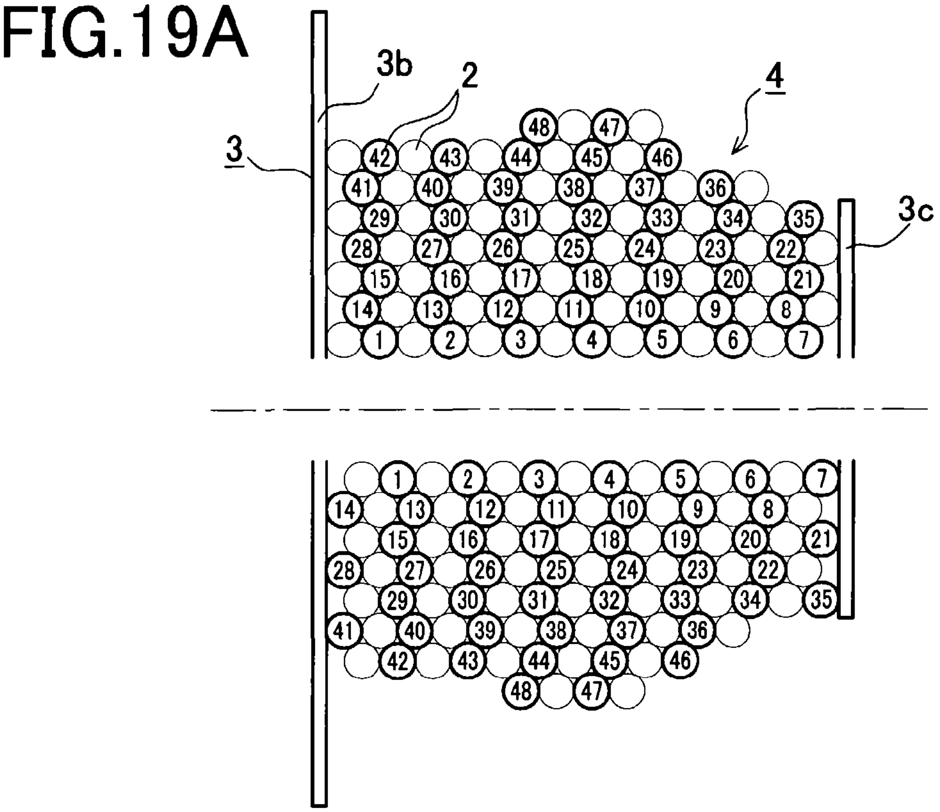
FIGS. 19A and 19B are explanatory views showing a process of winding wires on the bobbin, relating to sixth to eighth layers.
Figure 19B:
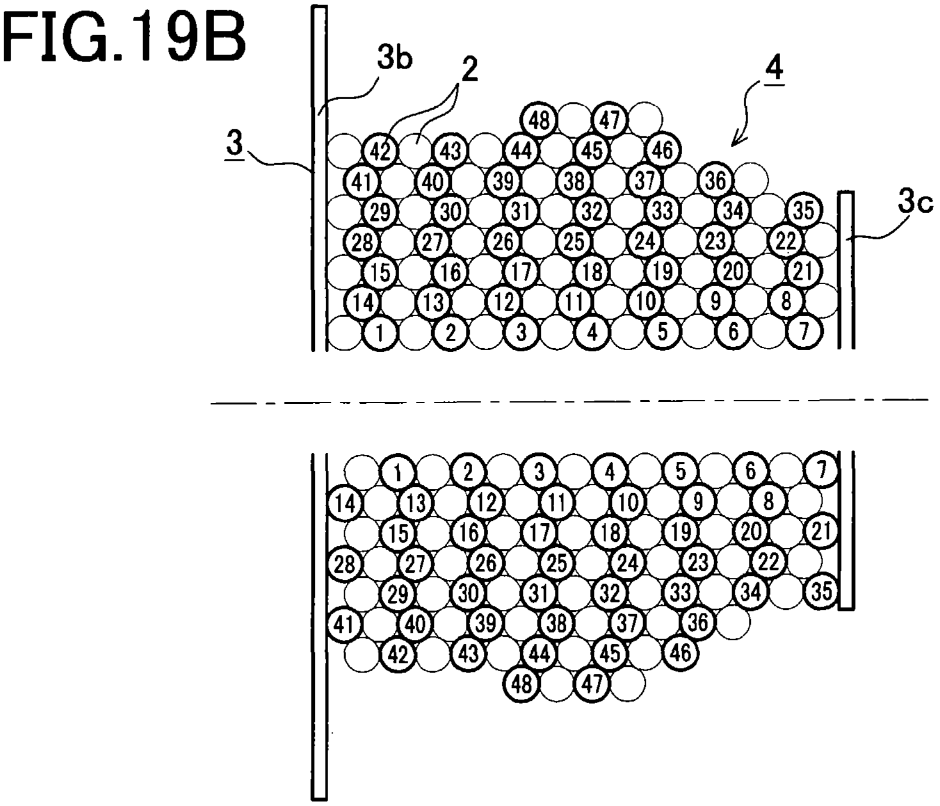
Figure 20A:
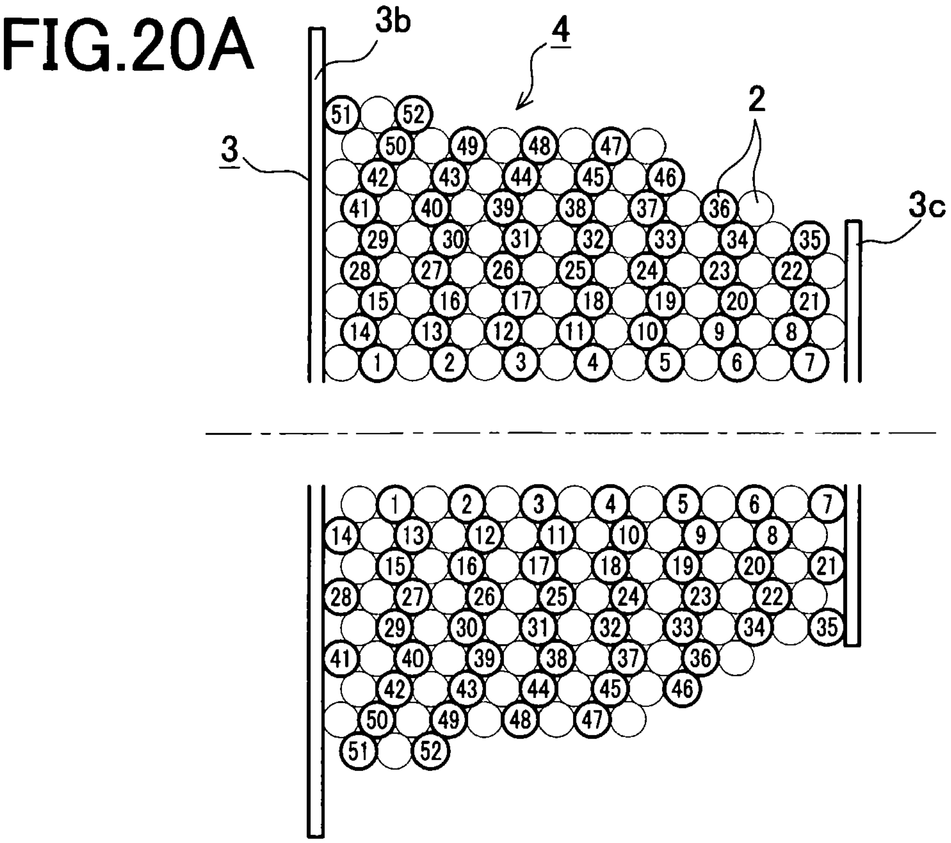
FIGS. 20A and 20B are explanatory views showing a process of winding wires on the bobbin, relating to eighth to ninth layers.
Figure 20B:
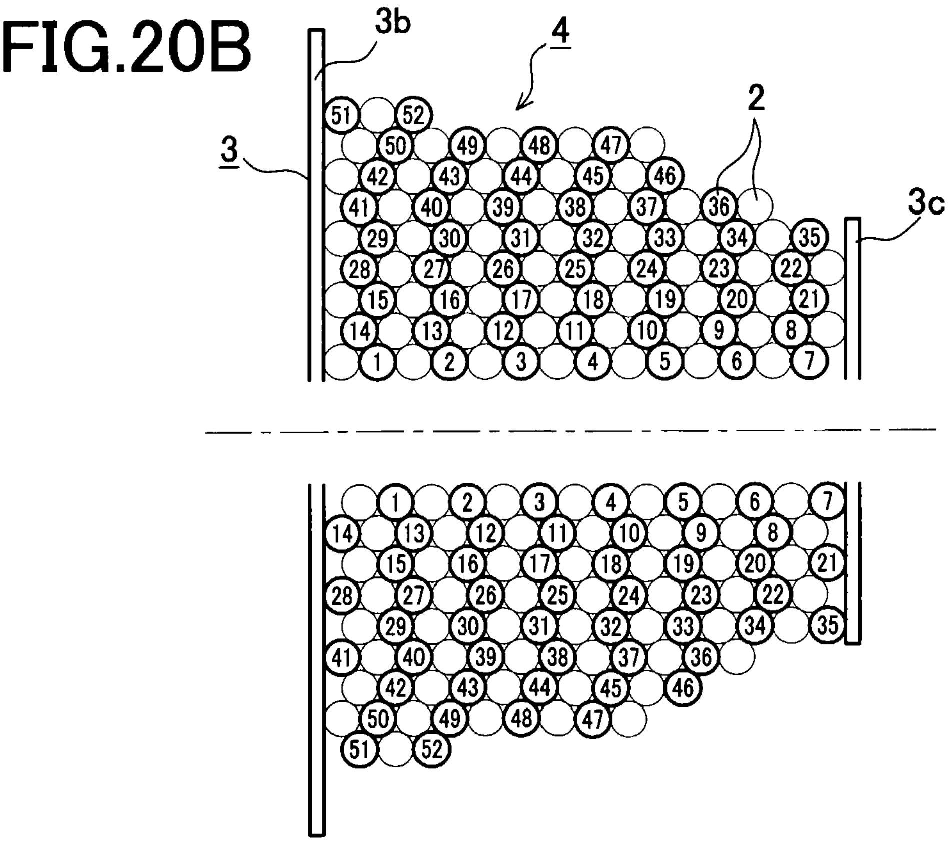
Figure 21A:
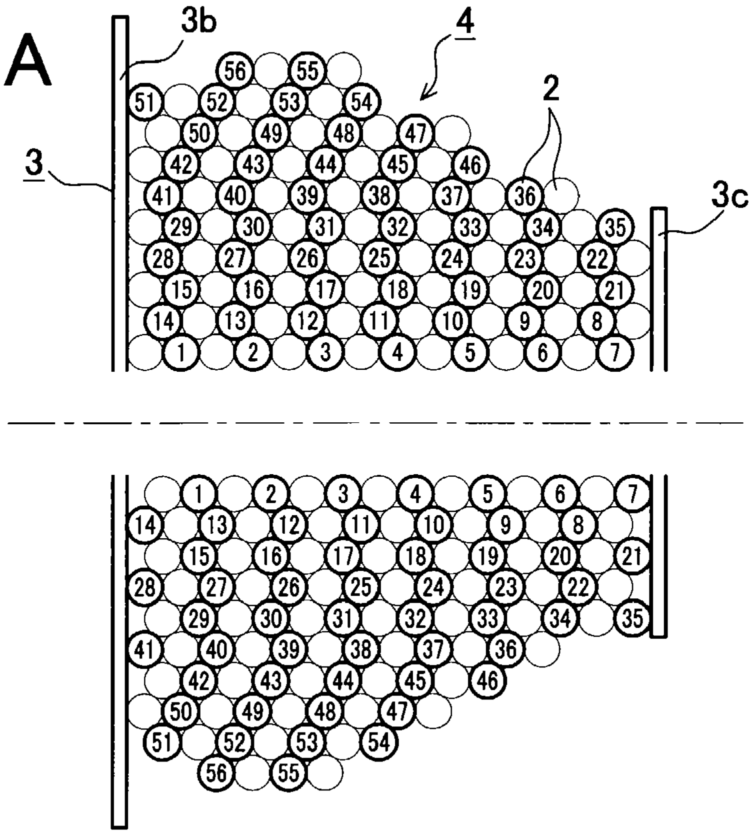
FIGS. 21A and 21B are explanatory views showing a process of winding wires on the bobbin, relating to ninth to tenth layers.
Figure 21B:
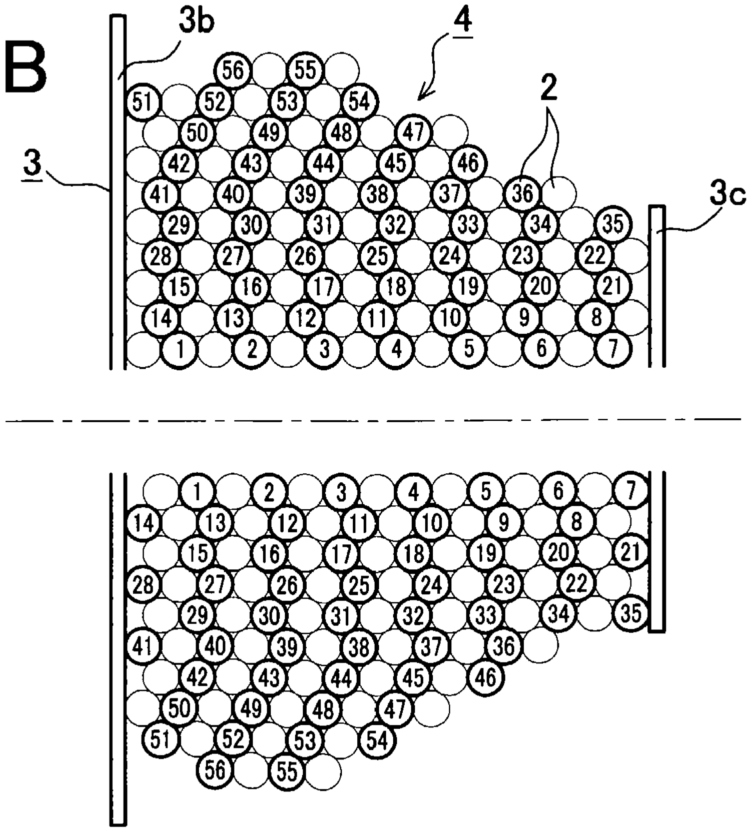

Here, to form the coil 4 having a trapezoidal section, the wires 2 are wound over nearly the entire area of the core tube of the bobbin 3 from a first layer to a fifth layer as shown in FIGS. 16 to 18. Then, the rows of the coil 4 in each layer are gradually reduced as Shown in FIGS. 19 to 21 to form a trapezoidal-section coil 4 finally having a total of ten layers as shown in FIG. 21.

Consequently, in this embodiment, the same operations and effects for the trapezoidal coil unit 11 as in the first embodiment can be attained. In this embodiment, furthermore, the coil 4 produced by the winding method using the "1.5-0.5 change" is used for both the rectangular coil unit 1 and the trapezoidal coil unit 11 in FIGS. 12 and 13. It is therefore possible to increase a space factor in assembly of the rectangular coil units 1 and the trapezoidal coil units 11, ensure the insulation between adjacently arranged coil units 1 and 11, and hence enhance reliability of motor performance.

It should be understood that the present invention is not limited to the above embodiments and may be embodied in other specific forms without departing from the essential characteristics thereof.

The invention is claimed is:

1. A winding method of regularly winding two wires on a bobbin that is rectangular in section, having a pair of ends in an axis direction and having four outer surfaces including a pair of parallel surfaces, the winding method including sequentially winding the wires in a row in the axis direction and turning back at each of the ends to be reciprocally wound, forming a coil with a plurality of rows and a plurality of layers of the wires, the method comprising the step of:

winding the wires on the bobbin so that the wires advance obliquely together along the axis direction for a lane change corresponding to 0.5 wire diameters on one of the pair of parallel surfaces and for a lane change corresponding to 1.5 wire diameters on the other one of the pair of parallel surfaces, wherein an outermost layer of the plurality of layers forms a uniform profile along an axial direction of the bobbin.

2. The winding method according to claim 1, wherein the winding method is used to manufacture a rectangular coil unit including a coil having a rectangular section.

3. The winding method according to claim 1, wherein the winding method is used to manufacture a trapezoidal coil unit including a coil having a trapezoidal section.

4. A coil unit including two wires regularly wound on a bobbin that is rectangular in section and has a pair of ends in an axis direction and has four outer surfaces including a pair of parallel surfaces, the wires being wound to be sequentially wound in a row in the axis direction and turned back at each of the ends to be reciprocally wound so that the coil unit has a plurality of rows and a plurality of layers of the wires, wherein the wires are wound on the bobbin so that the wires advance obliquely together along the axis direction for a lane change corresponding to 0.5 wire diameters on one of the pair of parallel surfaces and a lane change corresponding to 1.5 wire diameters on the other one of the pair of parallel surfaces, wherein an outermost layer of the plurality of layers forms a uniform profile along an axial direction of the bobbin.

* * * * *

UNITED STATES PATENT AND TRADEMARK OFFICE

CERTIFICATE OF CORRECTION

PATENT NO. : 7,868,726 B2
APPLICATION NO. : 12/085910
DATED : January 11, 2011
INVENTOR(S) : Mitsutoshi Asano It is certified that error appears in the above-identified patent and that said Letters Patent is hereby corrected as shown below:

On the Cover Page, before "(51) Int. Cl." add:

--(30) Foreign Application Priority Data

Dec. 26, 2005 (JP) 2005-373322--.

| Column | Line | |
|---|---|---|
| 4 | 5 | Change "center hole **31***h*" to --center hole **3***h*--. |

Signed and Sealed this
Seventeenth Day of May, 2011

David J. Kappos
*Director of the United States Patent and Trademark Office*